Figure 1:
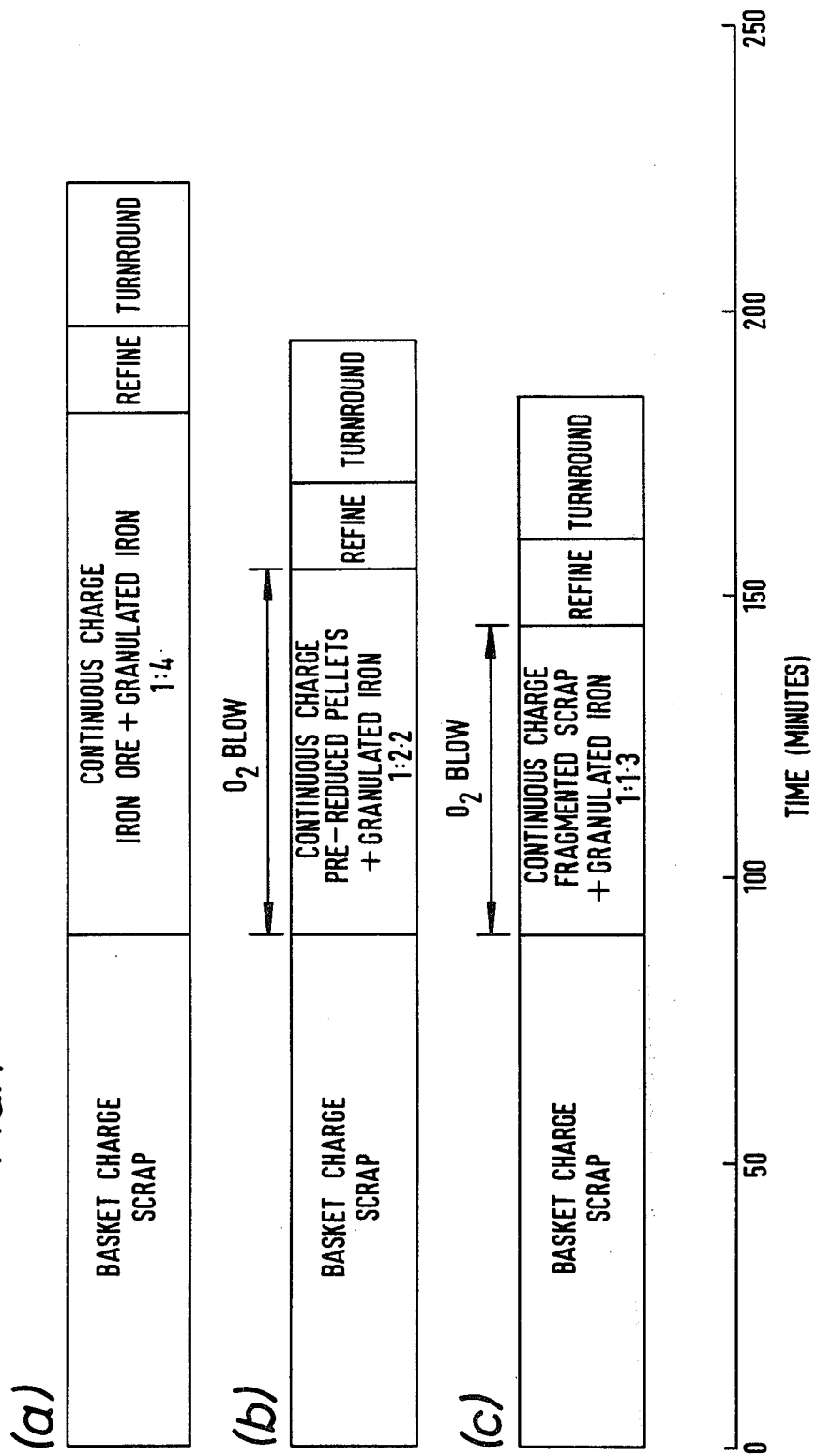

United States Patent [19]

Engledow

[11] 4,010,026
[45] Mar. 1, 1977

[54] ARC FURNACE STEELMAKING

[75] Inventor: David Engledow, Rotherham, England

[73] Assignee: British Steel Corporation, London, England

[22] Filed: July 7, 1975

[21] Appl. No.: 593,272

[30] Foreign Application Priority Data

July 22, 1975 United Kingdom ............. 32354/75

[52] U.S. Cl. .......................................... 75/11; 75/12
[51] Int. Cl.² ......................................... C21C 5/52
[58] Field of Search .................................. 75/11, 12

[56] References Cited
UNITED STATES PATENTS 3,276,859 10/1966 Collin ..................................... 75/11

*Primary Examiner*—Peter D. Rosenberg
*Attorney, Agent, or Firm*—Bacon & Thomas

[57] ABSTRACT

This invention relates to a method of steelmaking in which a blend of particulate high carbon and low carbon iron-bearing material is continuously charged into an arc furnace at a rate dependent on the electrical and chemical energy reactions therein. The high carbon particulate material may be blast furnace iron in either granulated or 'pigged' form; the low carbon material may be directly reduced iron pellets or fragmented scrap — alternatively iron ore may be used.

The steelmaking technique employed may be a batch process where a cycle is completed on tapping after continuous charging of the blend has been effected following melt-down of an initial scrap basket charge. Alternatively, a 'hot heel' technique may be employed where a residue of molten metal is left in the furnace after tapping so that continuous charging commences immediately after each tapping sub-cycle. Typically three of five such sub-cycles may complete a main cycle.

13 Claims, 2 Drawing Figures

ARC FURNACE STEELMAKING

This invention relates to a method of continuously charging iron-bearing materials into an electric arc furnace for steelmaking.

From one aspect the present invention provides a method of steelmaking in an electric arc furnace in which a blend of particulate high carbon and low carbon iron-bearing material is continuously charged into the furnace at a rate dependent on the electrical and chemical energy reations therein.

The high carbon particulate material may be blast furnace iron in either granulated or pigged form of a size suitable for continuous charging or even a composite of iron powder bonded with a carbonaceous material.

The low carbon particulate material may be directly reduced iron (sponge iron), e.g. in pelletised form, or fragmented scrap, but, alternatively iron ore may be used — either pelletised or rubble ore.

If blast furnace iron is used the carbon content thereof may typically be of the order of 4% although lower levels of carbon content are also understood to be embraced by the term 'high carbon'. By the term 'low carbon' in the context of the above we mean not more than about 0.8% although in a typical low carbon steel make it will preferably be much less, e.g. of the order of 0.3%. One of the chief factors to consider in determining the relative carbon values of the two materials is that the total carbon content in the blend may conveniently approximate to between, say, 1 and 2% which is a value which the furnace can adequately cope with under normal operating conditions.

Lime may also be continuously charged as part of the blend for removing sulphur and phosphorus in the usual manner.

The steelmaking technique employed may be a batch process where a cycle is completed on tapping after continuous charging of the blend has been effected following melt down of an initial scrap basket charge. Alternatively, a 'hot heel' technique may be employed where a residue of molten metal is left in the furnace after tapping so that continuous charging commences immediately after each tapping sub-cycle. Typically, three or five such subcyles may complete a main cycle.

Continuous charging techniques in electric arc steelmaking are of course well known, but hitherto such techniques have been limited to the continuous charging of directly reduced pellets or fragmented scrap, or in some instances iron ore or iron oxide scale together with additives.

The use of these matterials alone however is unsatisfactory in some respects. In particular, the use of directly reduced materials is unsatisfactory because the oxygen injection necessary to create and sustain the slag activity to protect the side walls of the furnace from the effects of radiation from the electric arcs, coupled with the un-reduced iron oxide which all directly reduced materials contain to some extent, often leads to over oxidation of the bath and poor carbon control. This is particularly true of pellets containing low carbon and high iron oxide contents.

The use of either fragmented scrap or iron ore pellets, especially the latter, leads to even greater difficulties as regards over oxidation of the bath and carbon control because of their adverse compositions with respect to their carbon content.

No consideration has hitherto been given to the continuous charging of a material having a high carbon content, e.g. blast furnace iron, since the oxygen flow normally associated with arc furnace practice would be insufficient to effect complete decarburisation, and if the oxygen flow rate were to be increased it is unlikely that the extraction equipment would be able to cope. Whilst high carbon steels, e.g. 1%C or more, may be produced the production of low carbon steels in particular would necessitate a lengthy decarburisation period following the continuous charging, negating any savings in productivity.

In accordance with this invention however the carbon to iron unit ratio is controlled by using a blend of particulate high carbon and low carbon iron-bearing material. In this manner the continuous charging technique can be applied to a wide range of carbon steels and both the electrical and chemical energy can be continuously kept at a maxima by adjustments in the ratio of the two materials constituting the blend. Significant increases in productivity can readily be obtained in this manner and basic cost calculations indicate a significant saving in raw material costs as compared with the conventional scrap charging route.

Figure 2:
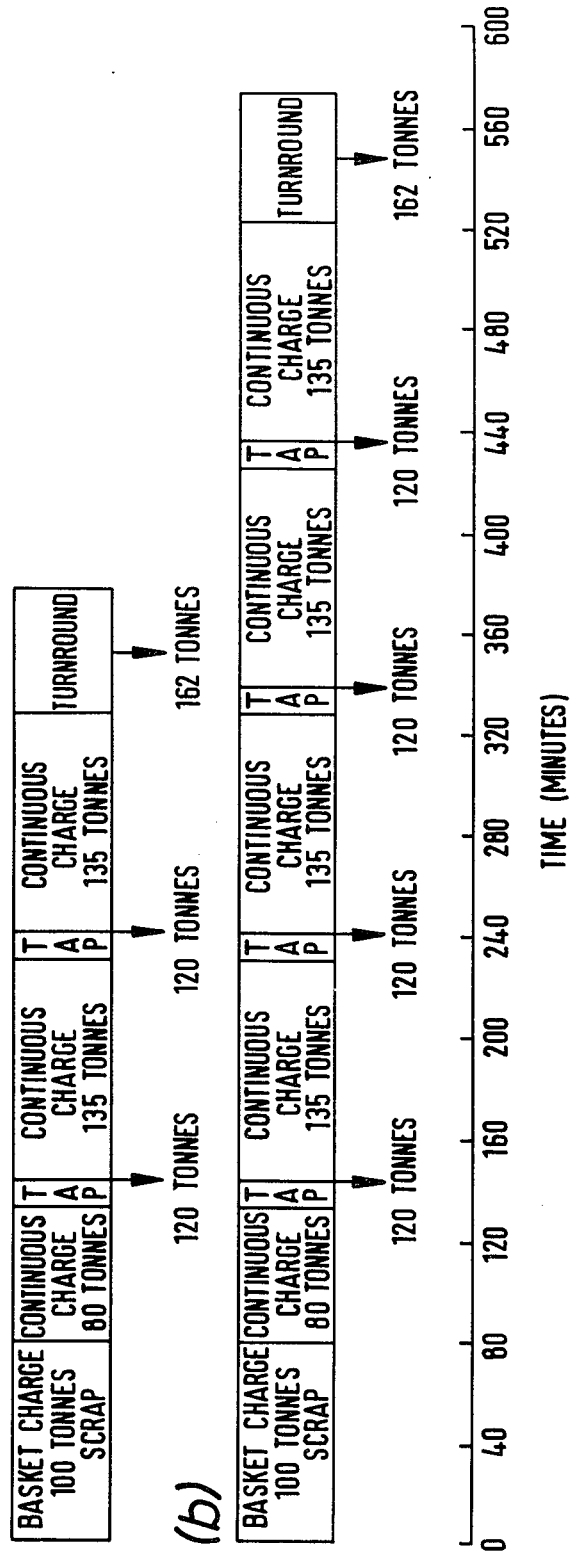

In order that the invention can be fully understood several examples will now be described with reference to the table given below and the steelmaking practice/time diagrams in the accompanying drawings in which:

FIG. 1 is a diagram of single cycle practice in accordance with this invention; and FIG. 2 is a diagram of multi cycle practice in accordance with this invention utilising the 'hot heel' technique.

In particular, baskets of scrap are initially charged into the hearth of an electric arc furnace, the roof is replaced and the arcs are struck to commence melting. At the completion of melt down a mixed charge of granulated iron and either pre-reduced iron pellets or fragmented scrap (which may be cryogenically fragmented) is charged into the furnace through a roof aperture at a controlled rate — together with lime — and oxygen injection commences.

The mixed charge is fed along a conveyor which is in turn separately fed from hoppers containing the materials which are discharged at a controlled rate or rates (they may be variable) in the required ratio. The iron granules, which may be produced by water atomisation of blast furnace iron, and the prereduced iron pellets, may range in size from say, ¼ - 1¼ inch diameter; the fragmented scrap may be fist-sized.

The rate of feed is such as to maximise the utilisation of the chemical and electrical energy, the carbon input to the furnace being controlled at just the rate the oxygen supply and fume equipment can cope with whilst allowing the full and continuous operation of the transformer on the top melting tap setting. The precise blend of the materials fed may of course be adjusted during the continuous charging period in an effort to arrive at the exact carbon content in the bath at tap.

In the table below and diagram (a) in FIG. 1 an example is given of initially charging 100 tonnes of scrap into a 80 MVA furnace, (165 tonnes tap weight) and, after completion of melt-down, continuously charging a blend of iron ore and granulated iron in the ratio 1:4. The charging rate during the continuous feed amounted to 55 tonnes/hr. At the completion of the cycle the tonnage tapped was such as to give a 'productivity' of 46 tonnes/hr an increase of 2% over the productivity associated with the normal basket charge utilising mainly scrap which, for the present purposes, will be regarded as 45 tonnes/hr.

| MATERIAL | O₂ input ft³/min | Charging rate tonnes/hr | Final %C | Productivity tonnes/hr | % increase over normal practice |
|---|---|---|---|---|---|
| Iron ore and granulated iron (1:4) | 0 | 55 | 0.14 | 46 | 2.0 |
| Directly reduced pellets (80%) and granulated iron (1:2.2) | 850 | 75 | 0.14 | 53 | 18.0 |
| Directly reduced pellets (95%) and granulated iron (1:1.75) | 1640 | 91 | 0.14 | 56 | 24.4 |
| Fragmented scrap and granulated iron (1:1.3) | 1640 | 93 | 0.14 | 57 | 26.7 |

In another example in the table (see also diagram (b) in FIG. 1) reference is made to the continuous charging of a blend of pre-reduced pellets and granulated iron in the ratio 1:2.2. The particular pellets employed have a metallisation of 80% — defined by the expression:

$$\frac{\text{metallic iron in pellets}}{\text{total iron (inc. iron content of iron oxide)}} \times 100\%$$

In this instance the continuous charging of the blend is accompanied throughout by the injection of oxygen. The productivity with this blend is given as 53 tonnes/hr. an increase of over 18% over the conventional figure. In general, the higher the degree of metallisation of the pellets the greater the productivity as can be seen in the example given on the next line in the table (95% metallisation).

In another example given in the table (see also diagram (c) in FIG. 1) a blend of fragmented scrap and granulated iron is continuously charged in the ratio 1:1.30. Oxygen is injected as before and the productivity is given as 57 tonnes/hr., an even better increase over conventional practice than the sponge iron blend. The scrap chosen had an iron content of about 96%.

In the examples given above the bath temperature was ostensibly maintained at 1600° C throughout charging and the oxygen input, where applicable, was maintained constant at the levels given.

As can be seen, the productivity increase is smallest in the case of iron ore and greatest during charging a blend of granulated iron and either pre-reduced pellets or fragmented scrap when the exothermic reaction of the metalloids and the electrical input to the furnace are maximised. As indicated above, in the latter case an increase in productivity of 25% or so is obtained over conventional basket charge practice which is significantly higher than the increase in productivity (10%) over conventional practice normally associated with the continuous charging of only pre-rediuced iron.

Even higher productivities may be obtained by utilising a hot-heel practice, that is, leaving a residue of molten metal behind in the furnace at the end of the first heat to start the next cycle. This eliminates the losses in both time and heat which accompany the removal of the roof to charge baskets of scrap — which occurs once per cycle with the practice described above and three times or so with the conventional practice.

Examples of three cycle (a) and five cycle (b) techniques utilising the hot heel practice are shown in the diagrams in FIG. 2, granulated iron being blended with highly metallised pre-reduced iron pellets. The three cycle practice gives a productivity of 65 tonnes/hr and the five cycle practice gives 67 tonnes/hr.

The invention thus affords a most significant increase in the steel output per unit time in an arc furnace. Furthermore, this blending concept can readily affect the chemical specification for directly reduced material in so far as the high carbon/high metallisation requirements necessary hitherto for continuous charging may be relaxed. Thus for example the (relatively) endothermic nature of this material can be offset by simply increasing the ratio of the granulated iron in the blend. In this manner pellets produced by certain processes which do not fulfil the high carbon/high metallisation specification so readily as pellets obtained by other processes can more readily be employed, providing more attractive cost reduction figures.

I claim:

1. A method of steelmaking in an electric arc furnace comprising the step of continuously charging a blend of particulate iron-bearing material to said furnace, said blend comprising a first particulate of low carbon iron-bearing material having a carbon content of less than about 0.8% and a second particulate of high carbon iron-bearing material having a carbon content greater than said first particulate and less than about 4%, the relative proportions of said first and second particulates comprising said blend and the rate of continuously charging said blend to said furance being controlled to:
    a. maximize the utilization of both the electrical energy supplied to said furnace and the chemical energy generated within said furnace by the charged materials; and,
    b. secure the desired carbon content of the steel on tapping said furnace.

2. A method of steelmaking in an electric arc furnace comprising the step of continuously charging a blend of particulate iron-bearing material to said furnace, said blend comprising a first particulate of low carbon iron-bearing material having a carbon content of less than about 0.8%, a second particulate of high carbon iron-bearing material having a carbon content greater than said first particulate and less than about 4%, and lime, the relative proportions of said first and second particulates comprising said blend and the rate of continuously charging said blend to said furnace being controlled to:
   a. maximize the utilization of both the electrical energy supplied to said furnace and the chemical energy generated within said furnace by the charged materials; and,
   b. secure the desired carbon content of the steel on tapping said furnace; said method further comprising the step of oxygen injection during the step of continuous charging.

3. The method of claim 1, wherein the step of continuously charging said blend to said furnace is preceeded by the step of a melt-down of an initial scrap basket charge, a cycle of said method being completed by the step of tapping said furnace after the step of continuous charging.

4. The method of claim 1, wherein the step of continuously charging said blend to said furnace is preceeded by the step of a melt-down of an initial scrap basket charge, and wherein a cycle of said method is comprised of a plurality of sub-cycles, each of said sub-cycles except the last corresponding to a partial tapping of said furnace whereby a portion of the molten charge in said furnace remains therein, each of said sub-cycles except the last being followed by the step of continuous charging.

5. A method according to claim 1, in which the actual blend of the materials is adjusted during the continuous charging period in dependence on the required carbon content on tapping.

6. A method according to claim 5, in which the high carbon particulate material is blast furnace iron in granulated or pigged form.

7. A method according to claim 5, in which the high carbon particulate material is a composite bond of iron powder with a carbonaceous material.

8. A method according to claim 5, in which the low carbon particulate material is directly reduced iron pellets.

9. A method according to claim 5, in which the low carbon particulate material is fragmented scrap.

10. A method according to claim 5, in which the low carbon particulate material is iron ore in pelletised or rubble form.

11. A method according to claim 1, in which the total carbon content of the blend is between 1 and 2%.

12. A method according to claim 2, in which the high carbon material is granulated iron and the low carbon material is in the form of directly reduced iron pellets.

13. A method of steelmaking in an electric arc furnace, in which a blend of particulate high carbon and low carbon iron-bearing material is continuously charged into a furnace at a rate dependent on the electrical and chemical energy reactions therein, the continuous charging being effected after melt-down of an initial scrap basket charge, and in which a cycle is completed after a number of tappings concluding a like number of sub-cycles, continuous charging additionally being effected immediately after each said sub-cycle (except the last) on to a residue of molten metal left in the furnace after the previous tap.

* * * * *

UNITED STATES PATENT OFFICE
CERTIFICATE OF CORRECTION

Patent No. 4,010,026            Dated March 1, 1977

Inventor(s)     DAVID ENGLEDOW

It is certified that error appears in the above-identified patent and that said Letters Patent are hereby corrected as shown below:

On the face of the patent under [30], correct

"July 22, 1975    United Kingdom ............. 32354/75" to read

---July 22, 1974    United Kingdom ............. 32354/74---.

Signed and Sealed this

Third Day of May 1977

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 4,010,026             Dated March 1, 1977

Inventor(s) DAVID ENGLEDOW

It is certified that error appears in the above-identified patent and that said Letters Patent are hereby corrected as shown below:

Column 6, delete Claim 13.

Signed and Sealed this

Twelfth Day of February 1980

[SEAL]

*Attest:*

SIDNEY A. DIAMOND

*Attesting Officer*      *Commissioner of Patents and Trademarks*